(12) United States Patent
Burton et al.

(10) Patent No.: US 7,159,450 B2
(45) Date of Patent: Jan. 9, 2007

(54) METHOD AND APPARATUS FOR ASSEMBLING AND TESTING A FLUID CONDUIT

(75) Inventors: David Burton, Guelph (CA); Nat Rea, Woodbridge (CA)

(73) Assignee: Martinrea International Inc., Vaughan (CA)

( * ) Notice: Subject to any disclaimer, the term of this patent is extended or adjusted under 35 U.S.C. 154(b) by 168 days.

(21) Appl. No.: 10/752,697

(22) Filed: Jan. 8, 2004

(65) Prior Publication Data

US 2005/0145017 A1    Jul. 7, 2005

(51) Int. Cl.
*G01M 3/04* (2006.01)

(52) U.S. Cl. ....................................................... 73/49.5

(58) Field of Classification Search ................. 73/49.1, 73/49.5, DIG. 8
See application file for complete search history.

(56) References Cited

U.S. PATENT DOCUMENTS

| | | | | |
|---|---|---|---|---|
| 2,561,540 A | * | 7/1951 | Sherbrooke | 248/49 |
| 2,983,137 A | * | 5/1961 | Lombard | 73/49.1 |
| 3,118,546 A | * | 1/1964 | McConnell et al. | 414/746.2 |
| 3,279,625 A | * | 10/1966 | McConnel et al. | 414/745.9 |
| 3,460,376 A | * | 8/1969 | Kemp | 73/49.5 |
| 4,232,659 A | * | 11/1980 | Dale | 600/36 |
| 4,326,406 A | * | 4/1982 | Smith | 73/49.1 |
| 4,362,049 A | * | 12/1982 | Horton | 73/49.6 |
| 4,470,295 A | * | 9/1984 | Pounds et al. | 73/49.5 |
| 4,570,485 A | * | 2/1986 | Lee, Jr. | 73/49.5 |
| 4,858,464 A | * | 8/1989 | Miller et al. | 73/49.5 |
| 5,122,110 A | * | 6/1992 | McNally et al. | 600/36 |
| 5,481,902 A | * | 1/1996 | Lanasa | 73/49.1 |
| 5,587,521 A | * | 12/1996 | Lanasa | 73/49.1 |
| 6,185,986 B1 | * | 2/2001 | Nelson et al. | 730/40.5 R |

* cited by examiner

*Primary Examiner*—Hezron Williams
*Assistant Examiner*—John Fitzgerald
(74) *Attorney, Agent, or Firm*—Etienne de Villers; Dimock Stratton LLP (57) ABSTRACT

A method and apparatus for assembling a fluid conduit assembly and testing the fluid conduit for leaks. Clipping devices support fasteners at a position remote from the conduit. According to the invention the fasteners can be loaded into clip nests provided by the clipping devices while leak testing of the conduit is performed. The performance of these steps simultaneously effectively eliminates the conventional requirement of pre-loading installation fasteners into the leak testing apparatus, and thus reduces the overall time required for the testing and assembly of fluid conduits by approximately one third. If the leak test is successful, all of the fasteners are then moved to the conduits and closed to integrate the conduit assembly.

7 Claims, 7 Drawing Sheets

METHOD AND APPARATUS FOR ASSEMBLING AND TESTING A FLUID CONDUIT

FIELD OF THE INVENTION

The present invention relates to production methods and apparatus. In particular, this invention relates to a method and apparatus for assembling a fluid conduit assembly and testing the fluid conduit for leaks.

BACKGROUND OF THE INVENTION

Rigid fluid conduits for automobiles, such as brake lines and fuel lines, typically must be bent and configured to fit along the undercarriage of an automobile. Such conduits function hydraulically, and must be tested for leaks before being installed, particularly in the case of brake and fuel systems where failure of the system during use could be catastrophic to the driver of the automobile.

In the case of fuel lines for example, a conventional leak testing apparatus provides a series of supports positioned to suspend the pre-configured fuel tubes at predetermined intervals during leak testing. Clips or brackets for fixing the tubes together to create an integrated fuel line assembly are placed by hand on the conduit supports in the leak testing apparatus. The clips or brackets also provide a post or other structure for affixing the conduits to the undercarriage of the automobile. Hereinafter the term "clips" is used to denote closeable clips, brackets and other such fasteners that are used for affixing components such as fuel lines together and/or to an automobile.

The conduits are then positioned in the open clips for leak testing. To test for leaks the conduits are pressurized by an air compressor, and any detected decrease in pressure will indicate a leak in the conduit. If a leak is detected, one or both of the conduits must be replaced. If there is no leak, the installation clips are closed to secure the conduits together and the fuel line assembly is removed from the leak testing device and ready to install in an automobile.

However, leak testing is a very delicate and sensitive process, and the fluid conduits must be suspended in a secure and completely motionless position in order to ensure that the results of the leak test are accurate. Accordingly, the tubes are suspended in the leak testing apparatus with the installation clips already installed, so that the clips are ready to be closed when the leak test is complete, to avoid any movement of the tubes during leak testing.

The conventional leak testing/tube clipping procedure thus requires time to load the clips; additional time to load the tubes into the open clips; additional time to conduct the leak test; and additional time to close the clips and unload the tube assembly. Due to the sensitive nature of the leak test, the clips cannot be loaded while leak testing is taking place.

SUMMARY OF THE INVENTION

The present invention significantly reduces the time required for the leak testing/tube assembling procedure. According to a preferred embodiment of the invention, at selected intervals along the conduit the leak testing apparatus provides clipping devices which support the clip at a position remote from the conduit. Whereas in prior art systems clips must be loaded into the leak testing apparatus before the conduits are suspended for testing, according to the invention the clips can be loaded into clip nests provided by the clipping devices while leak testing is taking place. If the leak test is successful, all of the clips are then moved to the conduits and closed simultaneously, and the tested tube assembly is then unloaded from the leak testing apparatus.

The invention thus provides a device for the automation of clip placement and closure, which allows the step of leak testing to be carried out at the same time as the loading of installation clips into the automated clipping devices. The performance of these steps simultaneously effectively eliminates the conventional requirement of pre-loading installation clips into the leak testing apparatus, and thus reduces the overall time required for the testing and assembly of fluid conduits by approximately one third, thereby substantially increasing the rate of production and commensurately reducing production costs.

The present invention thus provides a method of assembling and testing at least one fluid conduit, comprising the steps of: a. suspending the conduit from a plurality of supports; b. pressurizing the conduit and monitoring a pressure within the conduit for a preset interval to test for leaks; c. during step b., loading a closeable fastener to each of a plurality of clip nests respectively supporting the fastener at a first position remote from the conduit; d. after the leak test is complete, moving the fasteners to a second position adjacent to the conduit; and e. closing the fasteners.

The present invention further provides a clipping device for applying a fastener to a conduit, comprising a clip nest supported at a position remote from the conduit, an actuator for moving the clip nest toward the conduit, and a conduit clamp for clamping the conduit, actuated by moving the clip nest toward the conduit, whereby when a fastener is disposed in the clip nest and the clip nest is moved to a position where the fastener is adjacent to the conduit, the clamp bears against the conduit to hold the conduit in the fastener.

The present invention further provides an apparatus for assembling a fluid conduit assembly and testing the conduit for leaks, comprising a plurality of supports for suspending the conduit at preset intervals; a leak tester comprising a compressor for pressurizing the conduit to test for leaks; a plurality of clip nests for respectively supporting a plurality of fasteners at a first position remote from the conduit; and an actuator for moving the fasteners to a second position adjacent to the conduit.

BRIEF DESCRIPTION OF THE DRAWINGS

In drawings which illustrate by way of example only a preferred embodiment of the invention.

DETAILED DESCRIPTION OF THE INVENTION

Figure 1:
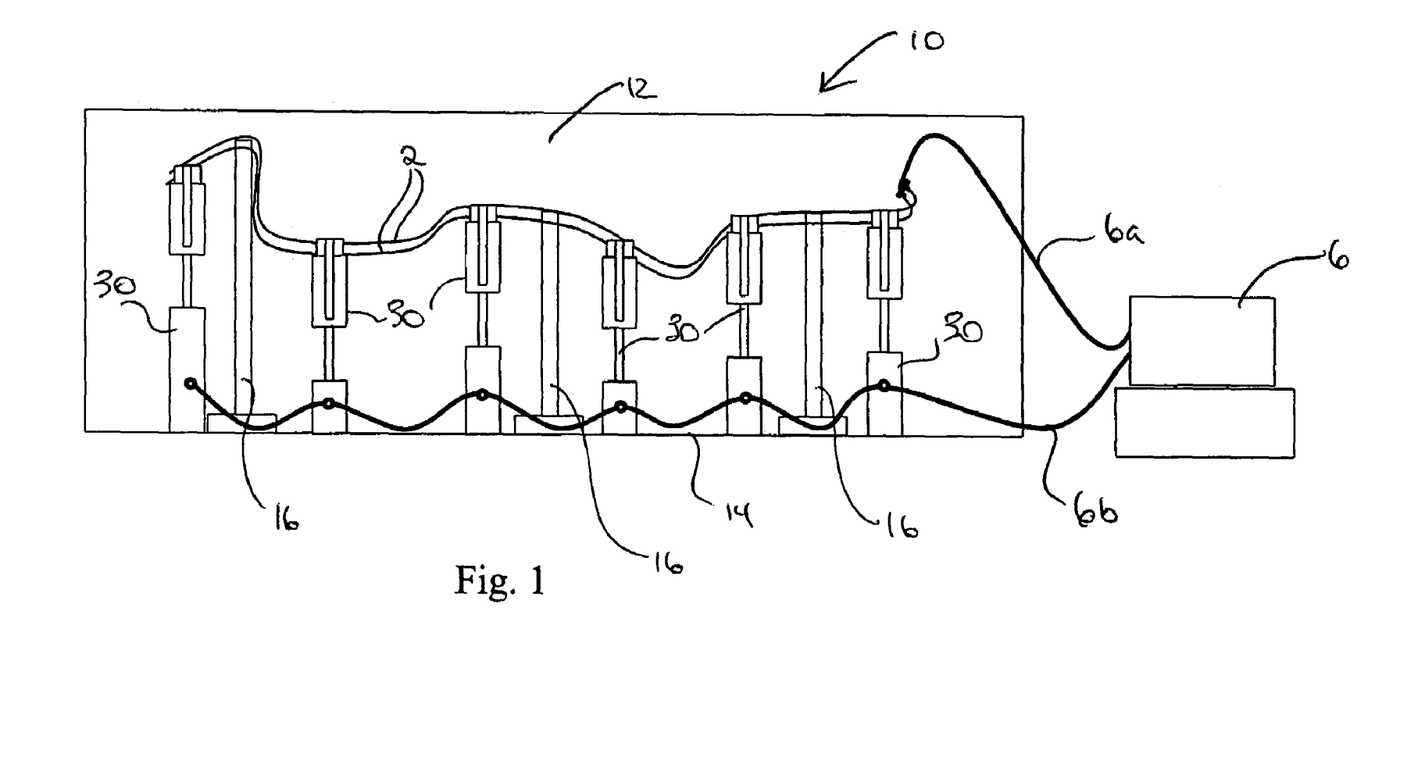
FIG. 1 is a schematic elevational view of a leak testing apparatus according to the invention.

FIG. 1 illustrates a leak testing apparatus 10 according to the invention. It will be appreciated that the leak testing apparatus 10 can be used for testing for leaks in any kind of conduit, it being advantageously used for pressure-testing automotive conduits such as fuel lines 2. It will be further appreciated that although the leak testing apparatus of the invention may be used to assemble and test a plurality of conduits 2, it is also useful for testing and assembling mounting clips to a single conduit.

The leak testing apparatus 10 conventionally comprises an open housing 12 with a floor 14 and a series of tube supports 16 positioned along a path conforming to the configuration of the tubes 2, suspending the tubes 2 at a sufficient number of positions to ensure a stable, motionless support for the tubes 2 during the leak testing process. In a conventional leak testing apparatus clips 4 are loaded onto the supports 16 prior to loading the tubes 2 into the leak testing apparatus. The closeable fasteners, for example clips or brackets 4 will be closed once the leak test is successfully completed, to fix the tubes 2 into an integrated tube assembly and to provide a means (for example a post 4a) for mounting the tube assembly to an automobile (not shown). The invention will be described with reference to the clips 4 illustrated, however it will be appreciated that the invention can be applied equally to conduits secured by clips, brackets or any other suitable fasteners.

According to the invention, the supports 16 are configured with tube nests, which support the tubes 2 directly, i.e. without first loading clips 4. The clips 4 are instead loaded onto a plurality of clipping devices 30 which support the clips 4 in a position remote from the tubes 2 until the leak test has been successfully completed, at which point the clips 4 are positioned against the tubes 2 and closed to complete the tube assembly. The leak testing apparatus 10 of FIG. 1 is thus used to perform a preferred embodiment of the method of the invention, which is as follows:

a. suspending at least one conduit 2 from a plurality of supports 16 in a leak testing apparatus 10;

b. pressurizing the conduit 2 and monitoring a pressure within the conduit 2 for a preset interval to test for leaks, c. during step b. loading a clip 4 to each of a plurality of clip nests 40 respectively supporting the clips 4 at a first position remote from the conduit 2;

d. after the leak test is complete, moving the clips 4 to a second position adjacent to the conduit 2; and e. closing the clips 4.

The step of moving the clips 4 to a second position adjacent to the conduit 2 is preferably performed by a clipping device 30 which automatically applies the clips 4 to the tubes 2, and preferably closes the clips 4 as well. FIGS. 2 to 5 illustrate a preferred embodiment of a clipping device 30 for automating the method of the invention in the leak testing apparatus 10 illustrated in FIG. 1.

Figure 4A:
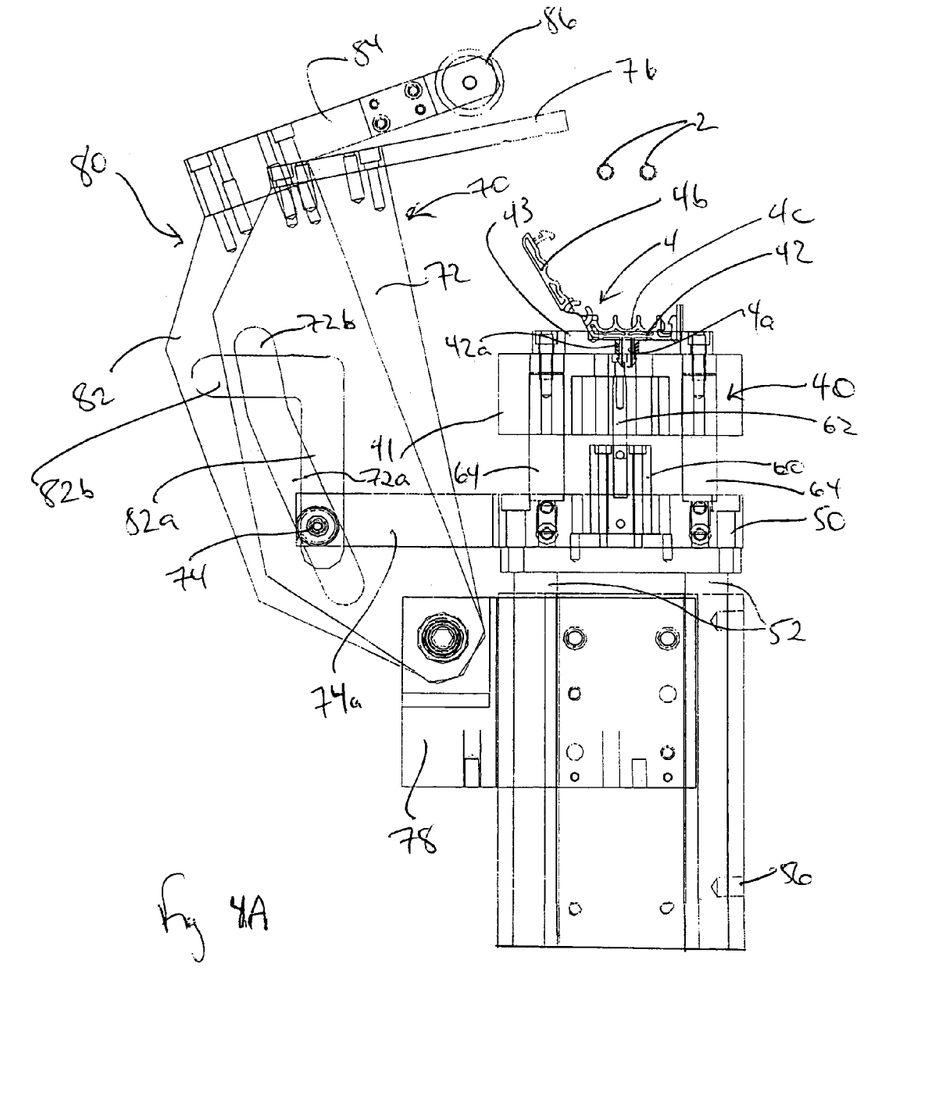
FIGS. 4A to 4C are schematic side elevations of the embodiment of FIG. 2 respectively showing the device infully retracted, partially elevated and fully elevated positions.

The clipping device 30 comprises a base 32 supporting a movable clip nest 40, for example comprising a block 41 having a removable insert 43 with a depression 42 configured to hold the clip 4 in a stable upright orientation. The clip 4 shown in the drawings by way of example comprises a post 4a for mounting the clip 4 (and thus the tube assembly) to the undercarriage of an automobile, and the clip nest 40 advantageously has a bottom opening 42a for receiving the post 4a, shown in FIG. 4, which helps to keep the clip 4 in position after loading. However, by forming the insert 43 separately from the block 41, the clip nest 40 can be readily adapted to different clips merely by replacing the clip insert 43 with an insert of a different configuration adapted to support a different style of clip.

Figure 4B:
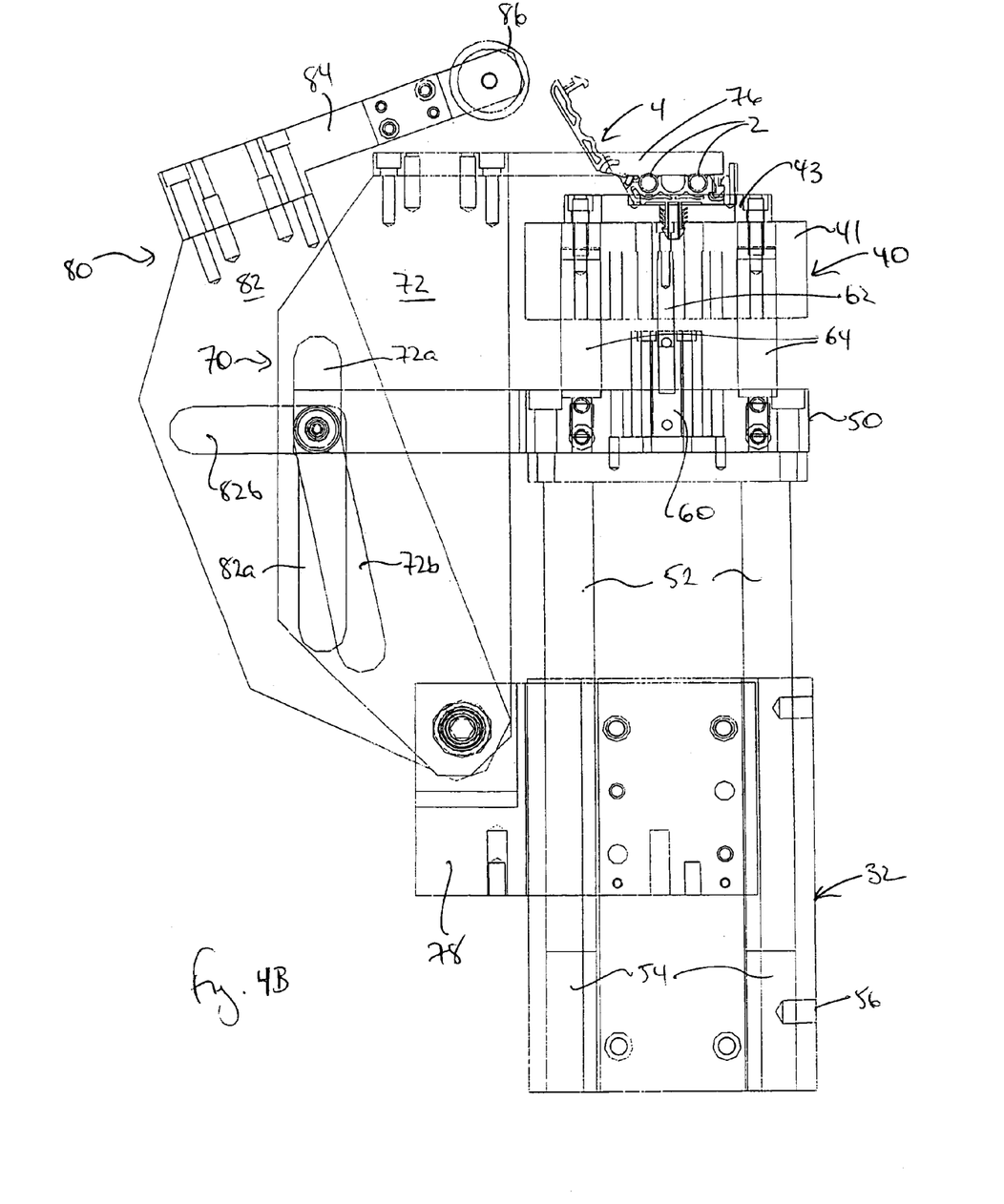

The clip nest 40 is supported on a movable platform 50, which is elevated and retracted by a primary actuator. It will be appreciated that this can be any actuator, however in the preferred embodiment this is advantageously a pneumatic actuator since the leak testing apparatus 10 already provides an air compressor 6. In the embodiment shown the primary actuator comprises a pair of pneumatic pistons 52 extending from pneumatic cylinders 54 formed in the base 32 (shown in FIG. 4B). The platform 50 is thus extended from the retracted position shown in FIG. 4A to an elevated position as shown in FIG. 4B by pressurizing the cylinders 54, for example through air port 56, and lowered back to the retracted position under the influence of gravity when the air pressure is released. Although a single piston 52 would be sufficient to elevate the platform 50 to the required level, a pair of pistons 52 is preferred in order to maintain precise alignment between the base 32 and the moving platform 50.

The clip nest 40 thus begins the leak test cycle in the position shown in FIG. 4A, remote from the tubes 2, allowing the operator to load clips 4 into the clip nest 40 after the conduits 2 have been affixed to the supports and while the leak test is being performed. After the leak test is successful, the clip nest 40 is raised to a second position, shown in FIG. 4B, at which the clip 4 is held adjacent to the tubes 2, as will be described in greater detail below.

Figure 2:
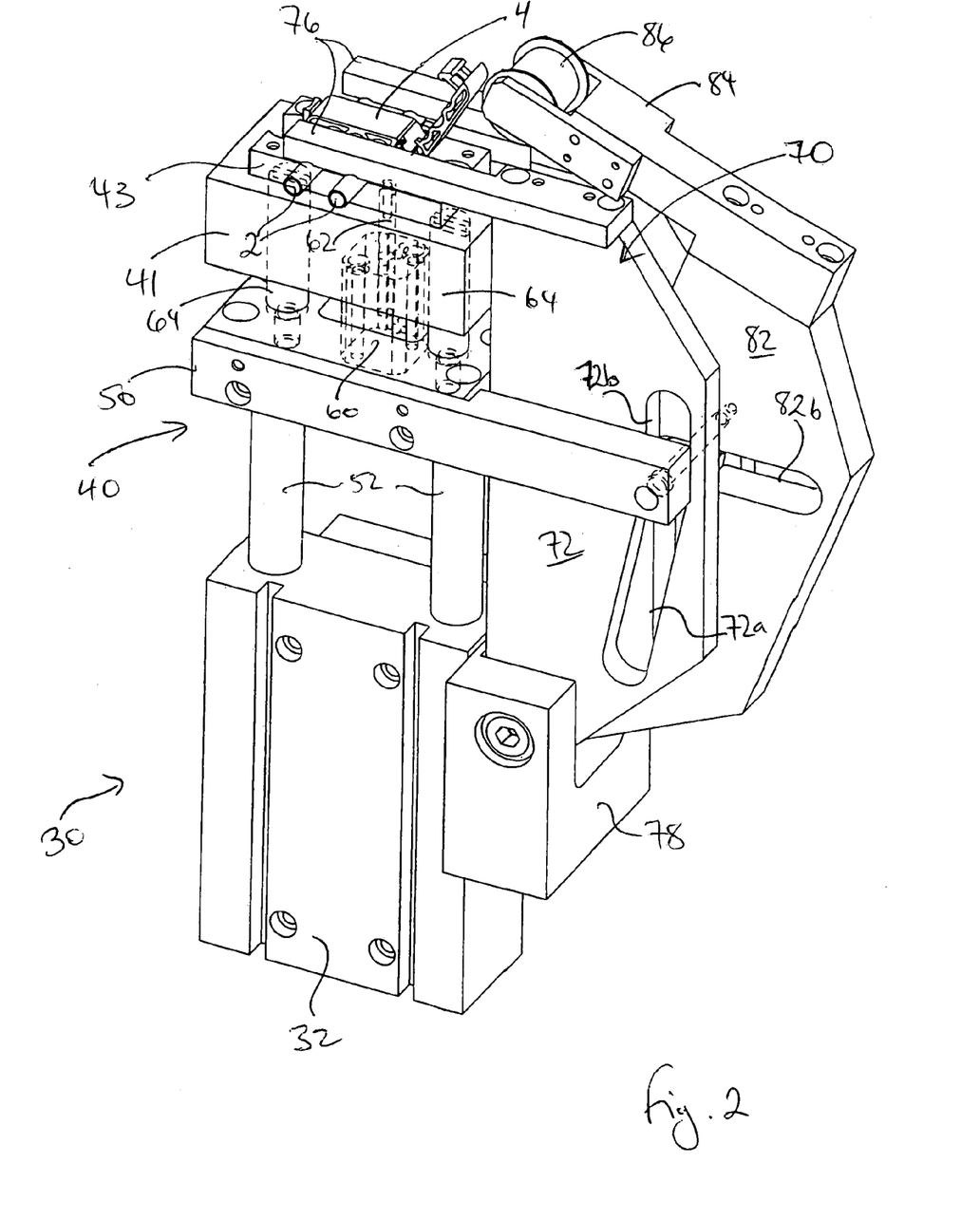
FIG. 2 is a perspective view of a preferred embodiment of a clipping device for the apparatus of the invention, taken from above and one side.
Figure 3:
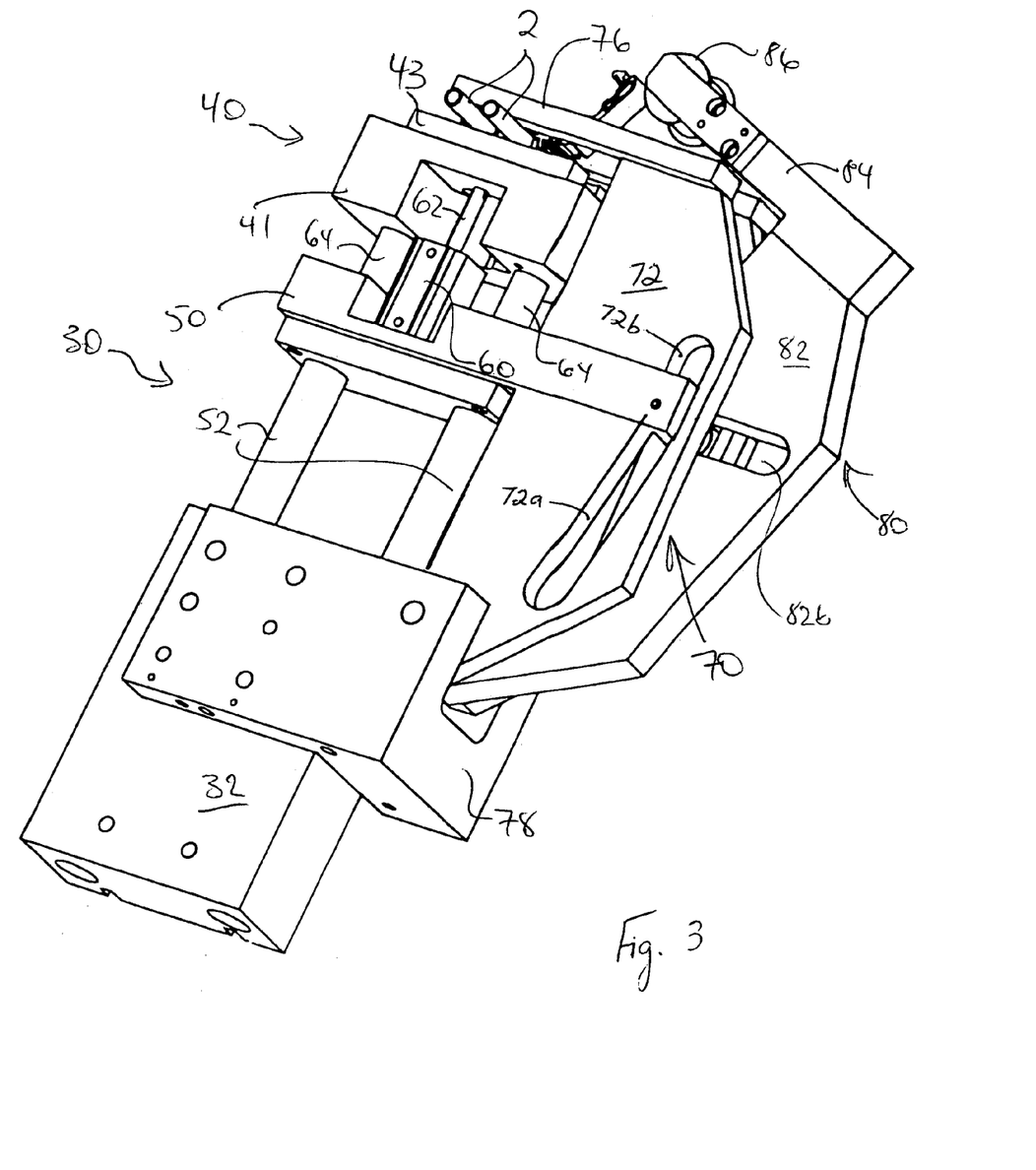
FIG. 3 is a perspective view of the embodiment of FIG. 2 taken from the same side and below.

A tube clamp 70, best seen in FIG. 2, is provided to clamp the tubes 2 against the clip 4 when the clip nest 40 is raised to the elevated position. In the embodiment shown a clamp arm 72 is pivotally mounted to the base 32, for example at mounting block 78, and provided with a slot 72a (best seen in FIG. 2) through which a pin or cam 74 is disposed. A brace arm 76 is fixed to the clamp arm 72. The cam 74 is fixed relative to the platform 50, as by cam arm 74a. The brace arm 76 thus pivots between a neutral position removed from the conduits 2 and a clamping position at which the brace 76 holds the tubes 2 against the clip 4. Elevation of the platform 50 thus causes the cam 74 to travel up the slot 72a, which is configured and oriented to draw the clamp arm 72 toward the base 32 and thus to draw the brace 76 down onto the tubes 2. The tubes 2 are clamped against the clip 4 as the clip nest 40 reaches the elevated position, as shown in FIG. 4B.

In the preferred embodiment the clipping device 30 also provides means for closing the clip 4 after the clip nest 40 has been raised to the elevated position. For this purpose the clip nest 40 is mounted to the platform 50 by a secondary actuator, in the preferred embodiment comprising a pneumatic cylinder 60 affixed to the platform 50 and driving a piston 62 affixed to the clip nest 40. preferably a pair of guide rods 64 is provided to maintain alignment between the clip nest 40 and the platform 50 as the secondary actuator is extended and retracted.

A clip closer 80 comprises a closer arm 82 pivotally mounted to the base 32, conveniently to mounting block 78, and provided with respective radial and transverse slot sections 82a, 82b (best seen in FIG. 3) through which the cam 74 is disposed. A roller arm 84 is fixed to the closer arm 82 and supports a roller 86 on its free end. The roller 86 thus pivots between a neutral position removed from the clip 4 and a closing position at which the roller 86 rolls along the top portion 4b of the clip 4 and presses the top portion 4b onto the body 4c of the clip to permanently close the clip 4.

The clip closer 80 is not actuated until the conduits 2 are clamped firmly in place within the clip body 4b. Elevation of the platform 50 causes the cam 74 to travel along the radial slot section 82a, which is already oriented generally in the direction of motion of the cam 74 and this motion therefore does not move the closer arm 82 even while the brace 76 is being drawn toward the clip 4, as shown in FIG. 4B.

Figure 4C:
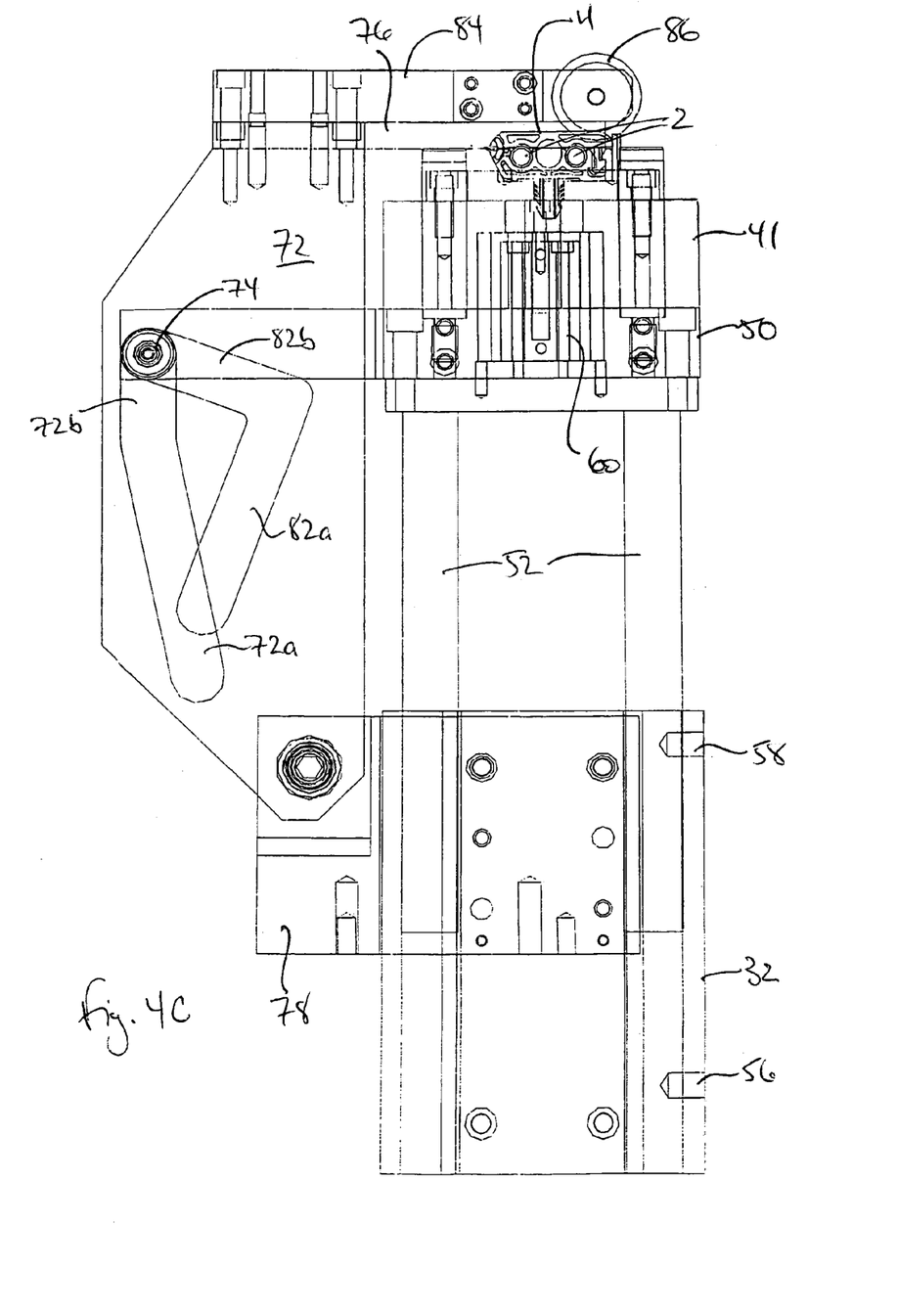
Figure 5:
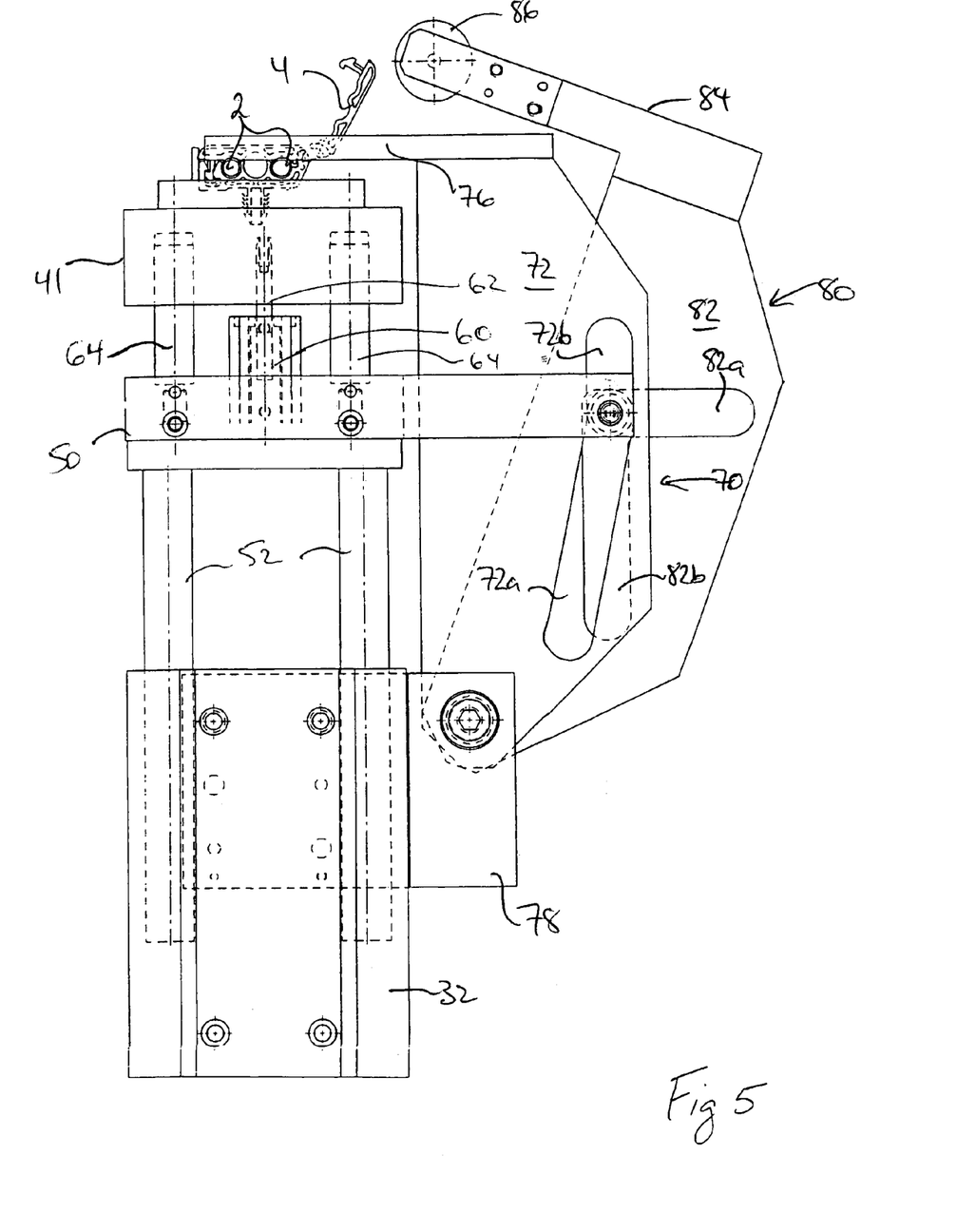
FIG. 5 is a side elevation of the embodiment of FIG. 2 in a fully retracted position.

To close the clip 4, the platform 50 is further elevated by the primary actuator, and at the same time the clip nest 40 is lowered by retracting the secondary actuator, which thus moves in opposition to the platform 50 to maintain the clip 4 in a stationary position adjacent to the conduits 2. During this interval the cam 74 travels along the transverse slot section 82b, which draws the roller arm 86 sharply toward the clip 4 to close the top 4b of the clip 4, as shown in FIG. 4C.

In operation, a leak testing apparatus 10 such as that illustrated in FIG. 1 is equipped with a plurality of clipping devices 30, one at each position where a clip 4 is desired, and a plurality of tube supports 16, positioned so as not to interfere with the clipping devices 30. A pneumatic hose 6b from a local air compressor 6 is coupled to the primary and secondary actuators of each clipping device 30. The conduits 2 are affixed to the supports 16, and a pneumatic hose 6a from the air compressor 6 is coupled to the ends of the tubes 2 in conventional fashion, as shown in FIG. 1, in preparation for the leak test.

The clipping devices 30 start in the position shown in FIG. 4A, with the primary actuator fully retracted and the secondary actuator fully extended. The clamp 70 and closer 80 are in the neutral position, with the brace 74 and roller 86 spaced well away from the tubes 2 and clip 4, respectively.

The tubes 2 are pressurized to perform the leak test. As the leak test is being performed the operator loads a clip 4 into the clip nest 40 of each clipping device 30, oriented such that the top portion 4a faces the closer 80. The top portion 4a of each clip 4 is left fully open.

Upon completion of the leak test, if the test indicates that a tube 2 has a leak, the leaking tube 2 is replaced and the test is performed again. If the test indicates that the tubes 2 are free of leaks, the operator actuates the primary actuator to elevate the platform 50. The secondary actuator is not actuated at this stage, so the clip nest 40 remains fixed in position relative to the platform 50. As the pistons 52 extend the platform 50 and clip nest 40 are elevated, and the cam 74 travels along the slots 72a and 82a. The closer arm 82 remains stationary, but the cam 74 travelling along the slot 72a draws the clamp arm 72 toward the base 32, and thus draws the brace 74 tightly down onto the tubes 2 to clamp the tubes 2 against the clip 4, as shown in FIG. 4B.

To close the clip 4, the primary actuator is actuated to further elevate the platform 50 while the secondary actuator is actuated to retract the piston 62 into the cylinder 60, and thus lower clip nest 40 toward the platform 50 as the platform 50 rises. The net result is that the clip nest 40 remains stationary at the level of the tubes 2 while the cam 74 travels into the transverse slot 82b, which draws the roller arm 86 sharply toward the clip 4, as shown in FIG. 4C. The roller 86 rolls along the top 4b of the clip 4, pressing the top 4a against the clip body 4b and lodging one or more barb-shaped projections into one or more openings, as is well known, to permanently close the clip 4 over the tubes 2. The clamp arm 72 is provided with a short radial slot section 72b, seen in FIG. 2, which allows the cam 74 to travel through the clip closing stage without affecting the position of the clamp 80.

With all clips 4 closed in this fashion, the secondary actuator is extended and the primary actuator is retracted, to return the platform 50 and clip nest 40 to the neutral position. The cam 74 travelling back along the slot 82b returns the closer 80 to the neutral position, and with further retraction of the primary actuator the cam 74 travelling back along the slot 72a returns the clamp 70 to the neutral position to release the tube assembly from the clipping devices 30. The supports 16 are unlatched and the tube assembly is removed from the leak testing apparatus 10. The next set of tubes 2 is positioned in the supports 16, and the process is repeated.

It will be appreciated that making the clip nest 40 movable relative to the platform 50, and providing the secondary actuator to move the clip nest 40 relative to the platform 50, is for the sole purpose of closing the clip 4. The aspects of the invention which allow the clips 4 to be loaded while the leak test is being performed, by providing a clip nest 40 in a first position remote from the tubes, and after the leak test is complete moving the clips 4 into position against the tubes 2, operate equally well whether or not the automatic clip closing system is provided.

Also, while the drawings illustrate a preferred embodiment in which the tubes 2 are supported above the clipping devices 30, and thus the operation of the clipping devices 30 is substantially in a vertical direction, it will be appreciated that since the tubes 2 are held firmly in place by the supports 16 during the operation of the leak testing apparatus 10, it is not necessary that the "floor" 14 of the leak testing apparatus be at the bottom. The supports 16 and clipping devices 30 can be oriented in any desired fashion, as long as the clips 4 do not dislodge from the clip nests 40 under the influence of gravity.

Various embodiments of the present invention having been thus described in detail by way of example, it will be apparent to those skilled in the art that variations and modifications may be made without departing from the invention. The invention includes all such variations and modifications as fall within the scope of the appended claims.

We claim:

1. A method of assembling and testing at least one fluid conduit, comprising the steps of:
   a. suspending the conduit from a plurality of supports;
   b. pressurizing the conduit and monitoring a pressure within the conduit for a preset interval to test for leaks;
   c. during step b., loading a closeable fastener to each of a plurality of clip nests respectively supporting the fastener at a first position remote from the conduit;
   d. after the leak test is complete, moving the fasteners to a second position adjacent to the conduit; and
   e. closing the fasteners.

2. The method of claim 1, wherein a plurality of conduits are suspended on die supports.

3. The method of claim 1, wherein the clip nests are formed in a clipping device and the step of moving the fasteners to a second position adjacent to the conduit comprises the step of actuating the clipping device to raise the clip nest.

4. The method of claim 3, wherein the step of closing the fasteners comprises the step of moving a roller arm toward each respective fastener, the roller arm supporting a roller which presses against a top portion of the fastener to close the fastener.

5. An apparatus for assembling a fluid conduit assembly and testing the conduit for leaks, comprising
   a plurality of supports for suspending the conduit at preset intervals;
   a leak tester comprising a compressor for pressurizing the conduit to test for leaks;

a plurality of clip nests for respectively supporting at a first position remote from the conduit a plurality of fasteners to be fastened to the conduit ; and an actuator for moving the fasteners to a second position adjacent to the conduit for fastening to the conduit.

6. An apparatus for assembling a fluid conduit assembly and testing the conduit for leaks, comprising a plurality of supports for suspending the conduit at preset intervals;

a leak tester comprising a compressor for pressurizing the conduit to test for leaks;

a plurality of clip nests for respectively supporting a plurality of fasteners at a first position remote from the conduit;

an actuator for moving the fasteners to a second position adjacent to the conduit; and a device for closing the fasteners.

7. The apparatus of claim 6 comprising a device for applying fasteners to the conduit comprising a clip nest supported at a position remote from the conduit, an actuator for moving the clip nest toward the conduit, and a conduit clamp for clamping the conduit, actuated by moving the clip nest toward the conduit, whereby when a fastener is disposed in the clip nest and the clip nest is moved to a position where the fastener is adjacent to the conduit, the clamp bears against the conduit to hold the conduit in the fastener.

* * * * *